United States Patent [19]

Sakai et al.

[11] Patent Number: 5,077,618
[45] Date of Patent: Dec. 31, 1991

[54] IMAGE DATA PROCESSING APPARATUS

[75] Inventors: Katsuyuki Sakai; Kenichi Shiraishi; Motohiko Hayashi, all of Yamatokoriyama; Sadaaki Shimonaga, Nara, all of Japan

[73] Assignee: Sharp Kabushiki Kaisha, Osaka, Japan

[21] Appl. No.: 431,775

[22] Filed: Nov. 6, 1989

[30] Foreign Application Priority Data

Nov. 7, 1988 [JP] Japan .................... 63-281788

[51] Int. Cl.$^5$ ............................................ H04N 1/04
[52] U.S. Cl. .................... 358/498; 358/496; 358/400
[58] Field of Search ............ 358/498, 496, 474, 471, 358/472, 400

[56] References Cited

U.S. PATENT DOCUMENTS

| | | | |
|---|---|---|---|
| 4,646,162 | 2/1987 | Sue | 358/498 |
| 4,729,036 | 3/1988 | Ikeda et al. | 358/498 |
| 4,750,046 | 6/1988 | Chu | |
| 4,895,288 | 1/1990 | Kotani et al. | 358/498 |

FOREIGN PATENT DOCUMENTS 01179563 10/1989 Japan .

*Primary Examiner*—Jin F. Ng
*Assistant Examiner*—Thomas D. Lee

[57] ABSTRACT

A facsimile apparatus has a single conveying roller in it, above which an image sensor is set and below which a printing head is set. Pressing pins are set respectively near the upper and lower ends of components supporting the conveying roller to freely rotate. In transmission, the lower pressing pins keep away the printing head from the conveying roller and the image sensor presses an original document onto the conveying roller. In reception, the upper pressing pins keep away the image sensor from the conveying roller and the printing head presses the recording paper onto the conveying roller. In this way, structure of the facsimile apparatus is simplified.

4 Claims, 4 Drawing Sheets (1)

(2)

IMAGE DATA PROCESSING APPARATUS

BACKGROUND OF THE INVENTION

1. Field of the Invention

The present invention relates to an image processing apparatus preferably used for a facsimile communication apparatus or the like.

2. Description of the Prior Art

A facsimile apparatus has been often used as mean for transmitting and receiving image data through public telephone lines. A facsimile apparatus reads an original document to be transmitted with a reading device such as a CCD (Charge Coupled Device) or the like and transmits the obtained image data through a public telephone line. A facsimile at the receiving side prints out the image data, using a thermal imaging device called a thermal printer for example.

Such a facsimile apparatus, as described above is made as a single apparatus to perform both transmission and reception. It, therefore, needs a driving mechanism to convey a document to allow the reading device read it prior to transmission, and also needs a driving mechanism to convey a recording sheet to allow the printing device to print image it in reception.

FIGS. 1 and 2 show configuration of a reading portion a recording portion 2 of an example of a conventional facsimile apparatus, respectively. As shown in these figures, the reading portion 1 comprises a back roller 4 and a reading glass 3 of transparent glass, and an original is pressed closely to the reading glass 3 by the back roller 4. This back roller 4 is rotated by a driving power transmitted from a motor 5 through a reduction gear 6. The reading device 7 of the CCD or the like is located and the side of the reading glass 3 opposite to the back roller 4.

In the recording portion 2, a recording sheet is conveyed in the direction of arrow 8 and is pressed closely to recording head 9, such as a thermal head by a platen roller 10. This platen roller 10 is rotated by a driving power transmitted from a motor 11 through a reduction gear 12.

A conventional facsimile apparatus as mentioned above needs to be provided with motors 5 and 11, reduction gears 6 and 12, and a back roller 4 and a platen roller 10 for a reading portion 1 and a recording portion 2, respectively. As a result, it has contained a large number of parts and a large body size.

SUMMARY OF THE INVENTION

An object of the present invention is to provide an image data processing apparatus to resolve the above-mentioned problems and to particularly miniaturize its body as well as to greatly reduce the number of parts.

The present invention provides an image data processing apparatus comprising;

a reading means which is moved in the directions intersectional to the conveying direction of an original document and be pressed onto the original document to read it and output its image data, a printing means which is moved in the directions along the moving directions of a reading means and be pressed onto the recording paper to print out image data on it, and working members which is located between the reading means and the printing means and keeps away one of the reading means and the printing means from the working members when the other of them is pressed onto the working members.

In a preferred embodiment a roller portion is located between the reading means and the printing means, and is to come into contact with them.

In a further preferred embodiment end components supporting the roller portion, freely in rotation, are located at both axial ends of the roller portion and are provided with the first working pins facing the reading means and the second working pins facing the printing means, the first working pins set at location where the first pins are pressed onto and detached from the reading means, corresponding to the first state of predefined angular motion of the end components and the second state in the reverse direction of the first state, and the second working pins set at locations where the second pins are detached from and pressed onto the printing means, corresponding to the first state of predefined angular motion of the end component and the second state.

In another preferred embodiment, the end components are provided with a driving means for bringing themselves into the first and second states of angular motion.

In an image data processing apparatus according to the invention, a reading means comes into contact with a working member and a printing means is kept away from it in case of reading an original document. Reading of the original is performed by conveying an original document through and between this reading means and the working member. On the other hand, in case of printing out image data, the printing means comes into contact with the working member and the reading means is kept away from it. Printing out image data is performed by conveying a recording sheet through and between this working member and the printing means.

In this way, both operations of reading an original document and printing out image data can be performed by alternate contact of the reading means and the printing means with the working member. Thereby it need not to be separately provided with driving mechanisms to carry an original document and a recording sheet for the reading means and the printing means, respectively. As a result, structure of the apparatus can be greatly simplified and also the number of parts can be remarkably reduced.

BRIEF DESCRIPTION OF THE DRAWINGS

These objects, the other objects, features, and merits of the invention will be clarified more expressly by the following detailed descriptions and drawings.

DETAILED DESCRIPTION OF THE PREFERRED EMBODIMENT

Figure 1:
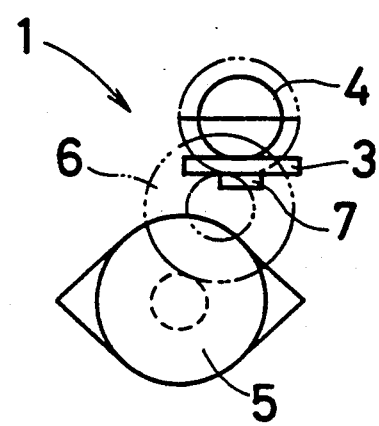
FIGS. 1 and 2 are figures showing a typical and conventional configuration.
Figure 2:
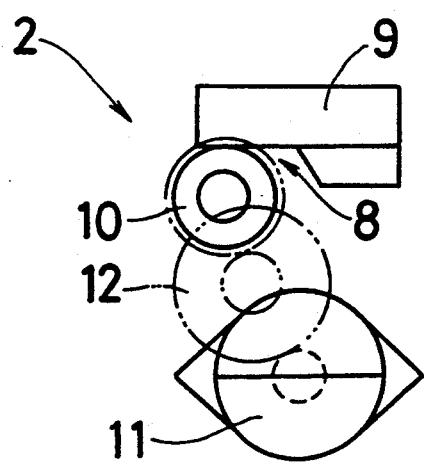

Referring to the drawings, a preferred embodiment of the invention is described in the details below.

Figure 3:
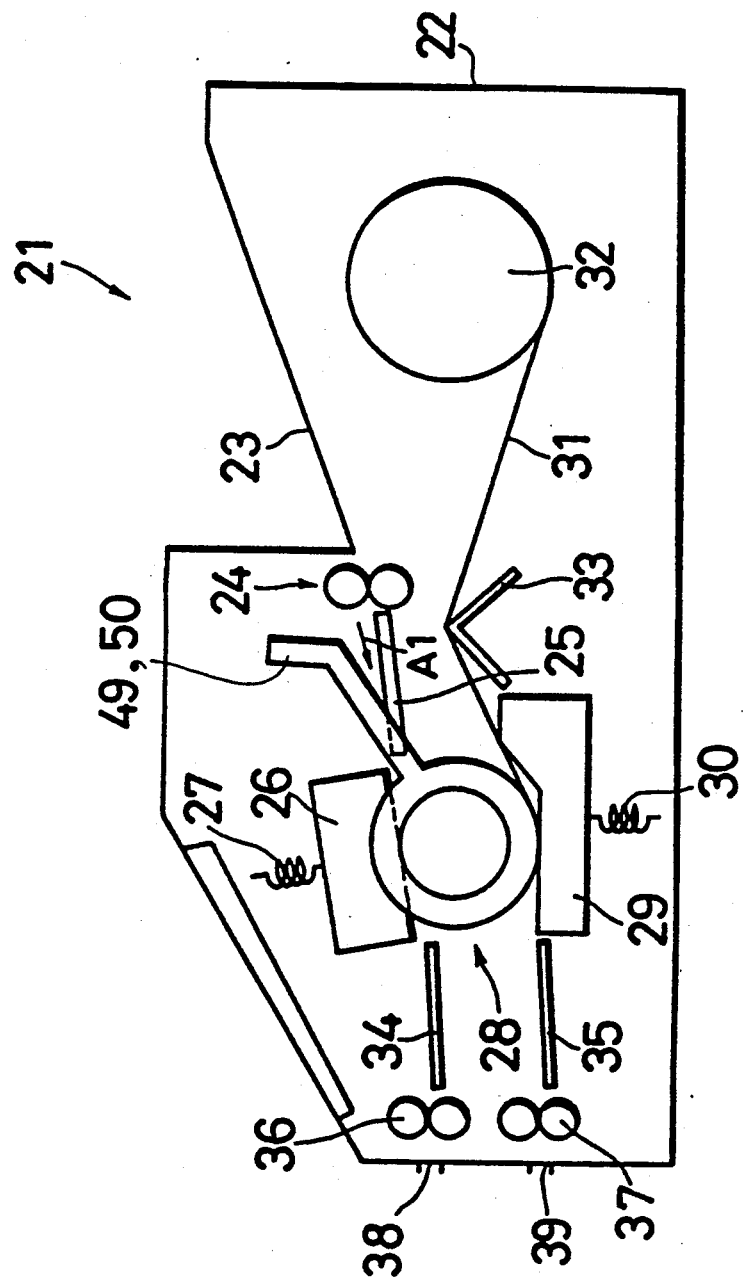
FIG. 3 is a figure to illustrate configuration of an embodiment of the invention.
Figure 4:
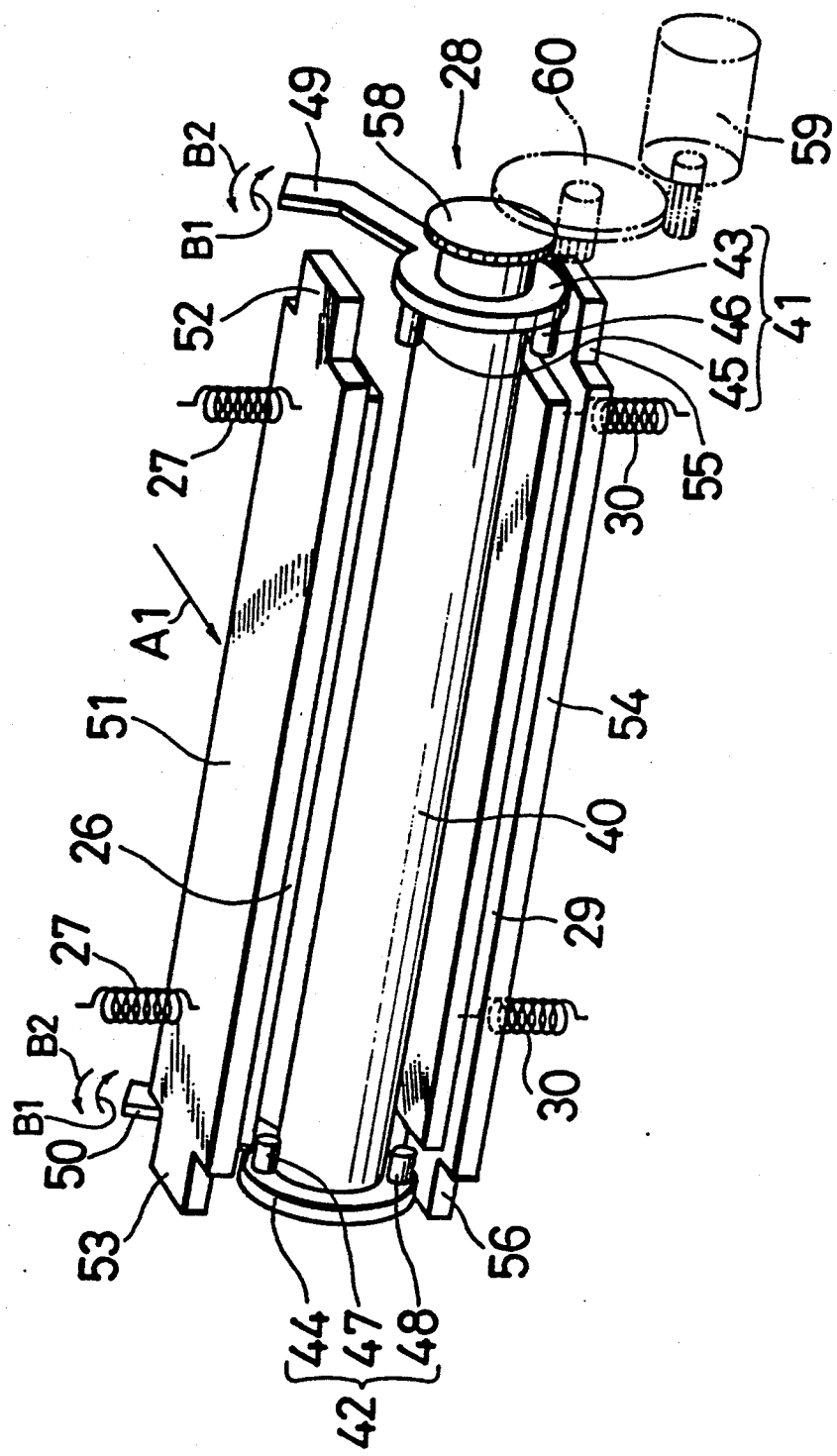
FIG. 4 is a perspective view showing a configuration pertaining to a roller 28.

FIG. 3 is a sectional view showing configuration of a facsimile apparatus 21 which is an embodiment of an image data processing apparatus of the invention, and FIG. 4 is a perspective view of a portion of it. Referring to FIGS. 3 and 4 together, the facsimile apparatus 21 is explained. In a housing 22 of the facsimile apparatus 21, original document feeding rollers 24 are provided to draw original documents, set on a document hopper 23 of the housing 22, one by one into the apparatus. A guide plate 25 and a reading device including a CCD or the like are located at the downstream side of the document feeding rollers 24 in the conveying direction A1.

The reading device 26 is pressed toward a roller 28 by such a pressing device 27 as a spring or the like. A printing means 29 including a thermal head or the like is located at a side of the roller 28 opposite to that of the recording device 26. The printing means is pressed toward the roller 28 by such a pressing device 30 as a spring or the like.

A roll 32 of recording paper 31 used for printing by the printing device 29 is put in the housing 22. The recording paper 31 from the roll 32 is led in between the printing device 29 and the roller 28 via a guide plate 33, and printing is performed there.

Guide plates 34 and 35, and discharge rollers 36 and 37 are located respectively at the downstream sides of the reading device 26, roller 28 and printing means 29 in the conveying direction A1. A read original document and a printed recording sheet 31 are discharged outside of the housing 22 through outlets 38 and 39, respectively.

The roller 28 has a roller portion 40 and a pair of working members 41 and 42 which are set at both axial end portions of the roller portion 40, respectively. The working members 41 and 42 respectively consist of end components 43 and 44 set on the roller portion 40, one and the other pairs of working pins 45 and 46, and 47 and 48 which are located respectively at the circumferential position corresponding to each other on the end components 43 and 44, and driving arms 49 and 50 as a driving device which continuously form respectively on the end components 43 and 44, and those working members 41 and 42 are reciprocated by unshown mechanisms in the directions of arrows B1 and B2. Namely, the working members 41 and 42 are given angular motion corresponding to reciprocation of the driving arms 49 and 50 in the direction of arrow B1 or B2. Working pins 45 and 47 make the first working pins, and working pins 46 and 48 make the second working pins, respectively.

The reading device is provided with a covering plate 51, in whose axial end portions protrusions 52 and 53 are formed at the locations where angular motion of the working members 41 and 42 in the direction of B1 or B2 allows working pins 45 and 47 be pressed onto or detached from the protrusions 52 and 53.

In the same way the printing device 29 is also provided with a covering plate 54 and its protrusions 55 and 56. The protrusions 55 and 56 are formed at the locations where angular motion of the working portions 41 and 42 in the direction of B1 or B2 allows working pins 46 and 48 to be released from or pressed onto the protrusions 55 and 56.

The roller portion 40 passes through the end component 43 so that it may rotate freely, and a driving gear 58 is set on an end of the roller portion 40. The driving power transmitted from the motor 59 to this driving gear 58, through a reduction gear 60, makes the roller portion 40 rotate.

Figure 5:
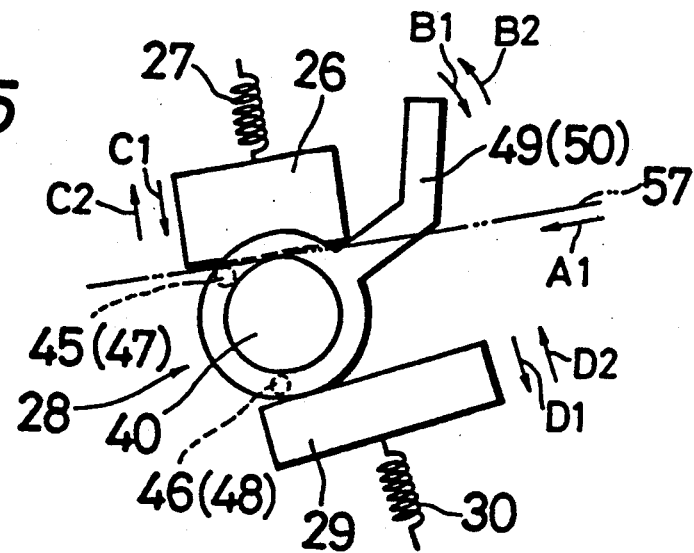
FIG. 5 (1) is a sectional view of a facsimile apparatus 21 in transmission and FIG. 5 (2) is a sectional view of the facsimile apparatus 21 in reception.
Figure 5:
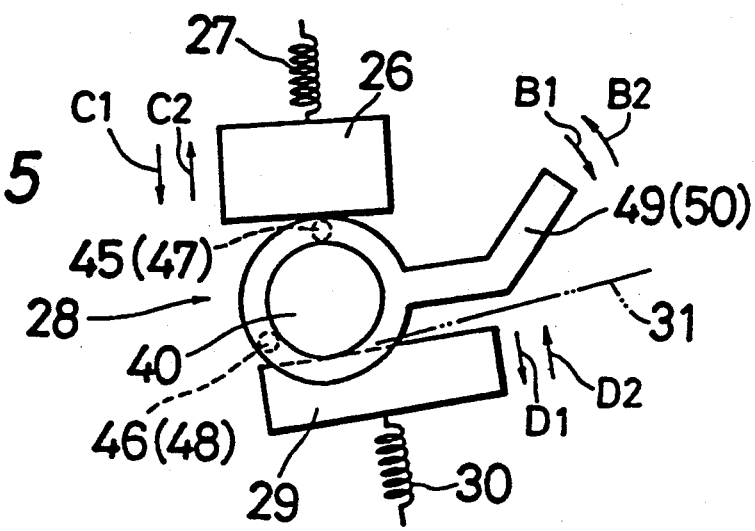

FIGS. 5(1) and 5(2) are figures illustration operation of the facsimile apparatus 21 of the embodiment of the invention. FIG. 5 (1) shows a state of the facsimile apparatus 21 in transmission. At this time the driving arms 49 and 50 are moved in the direction of arrow B2, and the working members 41 and 42, therefore, are turned in the direction of arrow B2 to come into the second state of angular motion. As a result, the working pins 45 and 47 are detached from the reading device 26, which is pressed onto the roller portion 40 by a pressing force of the pressing device 27. An original document 57 is read when it passes through between this reading device 26 and the roller portion 40 in the direction of arrow A1.

At this time, the printing device 29 is moved by the working pins 46 and 48 in the direction of arrow D1 against a pressing force of the pressing device 30, to be detached from the roller portion 40.

FIG. 5 (2) shows a state of the facsimile apparatus 21 in reception. In reception, the driving arms 49 and 50 are moved in the direction of arrow B1, and therefore, the working members 41 and 42 also are turned in the direction of arrow B1 to come into the first state of angular motion. At this time, the reading device 26 is moved by the working pins 45 and 47 in the direction of arrow C2, to be detached from the roller portion 40. On the other hand, the working pins 46 and 48 are detached from the printing device 29, which is pressed onto the roller portion 40 by a pressing force of the pressing device 30. In this state, received image data is printed on the recording paper 31 when it passes through between the roller portion 40 and the printing device 29.

In the embodiment of the invention, as mentioned above, the facsimile, apparatus 21 has been configured to use single combination of the roller 28, driving gear 58, reduction gear 60, and motor 59 in order to perform a read operation of an original document 57 in transmission, and a print operation onto a recording sheet 31 in reception. As a result, structure of the apparatus can be greatly simplified and the number of parts can be remarkably reduced, compared with conventional facsimile apparatuses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image data processing apparatus comprising:
   conveying means for conveying an original document in a first direction and for conveying recording paper in the first direction;
   reading means movable in directions perpendicular to the conveying direction of the original document and the recording paper, for being pressed against the original document and reading and outputting image data from the original document;
   printing means movable in directions perpendicular to the conveying direction of the recording paper, for being pressed against the recording paper and printing image data onto recording paper; and
   plural working members, operatively contactable to the reading means and the printing means, for releasing pressure to move one of the reading means and the printing means away from the conveying means and for simultaneously contacting and applying pressure to move the other of the reading means and the printing means toward the conveying means.

2. The image data processing apparatus of claim 1, wherein said conveying means includes a roller located between the reading means and the printing means, for being pressed against one of the reading and printing means, through the original document and recording paper, respectively, upon the one of the reading and printing means being moved toward the roller.

3. The image data processing apparatus of claim 2, wherein end components, freely supporting the roller for rotation and conveying, are located at axial ends of the roller and are operatively connected to the plural working members, the plural working members including first working pins, for applying and releasing pressure to the reading means and second working pins, for applying and releasing pressure to the printing means, the first working pins being set at locations where the first working pins are pressed against end released from the reading means, corresponding to a first state of predefined angular motion of the end components and a second state in a reverse direction of the first state, respectively, and the second working pins being set at locations where the second working pins are released from and pressed against the printing means, corresponding to the first state and the second state of predefined angular motion of the end components, respectively.

4. The image data processing apparatus of claim 3, wherein the end components are operatively connected to a driving means for driving end components in the first and second states of angular motion, respectively.

* * * * *